United States Patent
Lee et al.

(10) Patent No.: US 10,257,531 B2
(45) Date of Patent: Apr. 9, 2019

(54) METHOD AND APPARATUS FOR PROCESSING MULTIVIEW VIDEO SIGNALS BASED ON ILLUMINATION COMPENSATION AND INTER-VIEW MOTION CANDIDATE

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 158 days.

(21) Appl. No.: 15/125,689

(22) PCT Filed: Mar. 18, 2015

(86) PCT No.: PCT/KR2015/002629
§ 371 (c)(1),
(2) Date: Sep. 13, 2016

(87) PCT Pub. No.: WO2015/142054
PCT Pub. Date: Sep. 24, 2015

(65) Prior Publication Data
US 2017/0006302 A1    Jan. 5, 2017

(30) Foreign Application Priority Data
Mar. 19, 2014    (KR) .................. 10-2014-0032101

(51) Int. Cl.
H04N 19/597    (2014.01)
H04N 19/593    (2014.01)
(Continued)

(52) U.S. Cl.
CPC ........... *H04N 19/50* (2014.11); *H04N 13/161* (2018.05); *H04N 19/46* (2014.11); *H04N 19/513* (2014.11);
(Continued)

(58) Field of Classification Search
CPC .... H04N 13/0048; H04N 19/46; H04N 19/50; H04N 19/513; H04N 19/597; H04N 2013/0085
See application file for complete search history.

(56) References Cited

U.S. PATENT DOCUMENTS

2010/0232507 A1    9/2010    Cho et al.
2011/0243224 A1    10/2011    Su et al.
(Continued)

FOREIGN PATENT DOCUMENTS

CN    102870414 A    1/2013
CN    103096071 A    5/2013
(Continued)

*Primary Examiner* — Jorge L Ortiz Criado
*Assistant Examiner* — Yong Joon Kwon
(74) *Attorney, Agent, or Firm* — IP Legal Services, LLC

(57) ABSTRACT

A method for processing multiview video signals, according to the present invention, comprises: generating a merge candidate list with respect to a current block; inducing a motion vector of the current block on the basis of a merge index of the current block, which has been obtained from a bitstream; obtaining a prediction value of the current block using the motion vector; and reconstructing the current block by adding the prediction value and a residual value of the current block.

7 Claims, 7 Drawing Sheets

(51) Int. Cl.
*H04N 19/51* (2014.01)
*H04N 19/44* (2014.01)
*H04N 19/503* (2014.01)
*H04N 19/50* (2014.01)
*H04N 13/161* (2018.01)
*H04N 19/46* (2014.01)
*H04N 19/513* (2014.01)
*H04N 13/00* (2018.01)

(52) U.S. Cl.
CPC ... *H04N 19/597* (2014.11); *H04N 2013/0085* (2013.01)

(56) References Cited

U.S. PATENT DOCUMENTS

| | | |
|---|---|---|
| 2013/0107959 A1 | 5/2013 | Park et al. |
| 2014/0184740 A1* | 7/2014 | Zhang ............ H04N 19/597 348/43 |
| 2014/0269909 A1 | 9/2014 | Oh et al. |
| 2014/0307789 A1 | 10/2014 | Kim et al. |
| 2014/0341284 A1 | 11/2014 | Kim et al. |
| 2015/0163494 A1 | 6/2015 | Park et al. |
| 2016/0173873 A1 | 6/2016 | Oh et al. |
| 2016/0173877 A1 | 6/2016 | Oh et al. |
| 2016/0173878 A1 | 6/2016 | Oh et al. |
| 2016/0249051 A1 | 8/2016 | Oh et al. |
| 2016/0249054 A1 | 8/2016 | Park et al. |
| 2017/0054995 A1 | 2/2017 | Kim et al. |
| 2017/0078673 A1 | 3/2017 | Kim et al. |
| 2017/0127059 A1 | 5/2017 | Kim et al. |
| 2017/0142419 A1 | 5/2017 | Kim et al. |
| 2017/0142420 A1 | 5/2017 | Kim et al. |
| 2017/0237978 A1 | 8/2017 | Kim et al. |
| 2017/0237979 A1 | 8/2017 | Kim et al. |
| 2017/0237993 A1 | 8/2017 | Kim et al. |

FOREIGN PATENT DOCUMENTS

| | | |
|---|---|---|
| JP | 2009-530960 A | 8/2009 |
| KR | 10-2008-0034752 A | 4/2008 |
| KR | 10-2009-0037888 A | 4/2009 |
| KR | 10-2013-0028633 A | 3/2013 |
| WO | 2013/069933 A1 | 5/2013 |
| WO | 2013/070001 A1 | 5/2013 |

* cited by examiner (a)　　　　　　　　　　　　(b)

FIG. 8

| ic_flag | | 1 | 0 |
|---|---|---|---|
| Priority Order of Merge Candidates | 0 | IvDC | IvMC |
| | 1 | A1 | A1 |
| | 2 | B1 | B1 |
| | 3 | IvMC | IvDC |
| | 4 | B0 | B0 |
| | 5 | VSP | VSP |
| | 6 | IvDCShift | IvMCShift |
| | 7 | IvMCShift | IvDCShift |
| | 8 | A0 | A0 |
| | 9 | B2 | B2 |
| | 10 | temporal neighboring block | temporal neighboring block |

METHOD AND APPARATUS FOR PROCESSING MULTIVIEW VIDEO SIGNALS BASED ON ILLUMINATION COMPENSATION AND INTER-VIEW MOTION CANDIDATE

CROSS REFERENCE TO RELATED APPLICATIONS

This application is a National Stage Patent Application of PCT International Patent Application No. PCT/KR2015/002629 (filed on Mar. 18, 2015) under 35 U.S.C. § 371, which claims priority to Korean Patent Application No. 10-2014-0032101 (filed on Mar. 19, 2014), the teachings of which are incorporated herein in their entireties by reference.

TECHNICAL FIELD

The present invention relates to a method and apparatus for encoding a video signal.

BACKGROUND ART

Demands for a high-resolution, high-quality video such as a High Definition (HD) video and an Ultra High Definition (UHD) video have recently increased in various fields of applications. As video data has a higher resolution and higher quality, the video data is larger in amount than traditional video data. Therefore, if video data is transmitted on an existing medium such as a wired/wireless wideband circuit or stored in an existing storage medium, transmission cost and storage cost increase. To avert these problems encountered with high-resolution, high-quality video data, high-efficiency video compression techniques may be used.

There are a variety of video compression techniques including inter-picture prediction in which pixel values included in a current picture are predicted from a picture previous to or following the current picture, intra-picture prediction in which pixel values included in a current picture are predicted using pixel information within the current picture, and entropy encoding in which a short code is assigned to a more frequent value and a long code is assigned to a less frequent value. Video data may be compressed effectively and transmitted or stored, using such a video compression technique.

Along with the increasing demands for high-resolution videos, demands for three-dimensional (3D) video content as a new video service have been increasing. A video compression technique for effectively providing HD and UHD 3D video content is under discussion.

DISCLOSURE

Technical Problem

An object of the present invention is to provide a method and apparatus for performing inter-view prediction using a disparity vector, when a multiview video signal is encoded/decoded.

Another object of the present invention is to provide a method and apparatus for deriving a disparity vector of a texture block using depth data of a depth block, when a multiview video signal is encoded/decoded.

Another object of the present invention is to provide a method and apparatus for deriving a disparity vector from a neighboring block of a current block, when a multiview video signal is encoded/decoded.

Another object of the present invention is to provide a method and apparatus for deriving an inter-view merge candidate using a disparity vector, when a multiview video signal is encoded/decoded.

Another object of the present invention is to provide a method and apparatus for configuring a merge candidate list for a merge mode, when a multiview video signal is encoded/decoded.

Another object of the present invention is to provide a method and apparatus for selectively using an inter-view motion candidate in consideration of illumination compensation, when a multiview video signal is encoded/decoded.

Another object of the present invention is to provide a method and apparatus for determining an order of arranging merge candidates in a merge candidate list in consideration of illumination compensation, when a multiview video signal is encoded/decoded.

Technical Solution

A method and apparatus for decoding a multiview video signal according to the present invention are characterized in that a merge candidate list for a current block is generated, a motion vector of the current block is derived based on a merge index of the current block, acquired from a bitstream, a prediction value of the current block is acquired using the derived motion vector, and the current block is reconstructed by adding the acquired prediction value and a residual value of the current block.

The method and apparatus for decoding a multiview video signal according to the present invention are characterized in that the merge candidate list includes at least one merge candidate, and the at least one merge candidate includes at least one of a spatial neighboring block, a temporal neighboring block, or an inter-view motion candidate (IvMC).

The method and apparatus for decoding a multiview video signal according to the present invention are characterized in that the merge index specifies a merge candidate used to decode the current block in a merge mode.

The method and apparatus for decoding a multiview video signal according to the present invention are characterized in that the inter-view motion candidate (IvMC) has a temporal motion vector of a reference block specified by a disparity vector of the current block, and the reference block belongs to a reference view of the current block.

The method and apparatus for decoding a multiview video signal according to the present invention are characterized in that the inter-view motion candidate (IvMC) is restrictively included in the merge candidate list according to whether illumination compensation is performed for the current block.

The method and apparatus for decoding a multiview video signal according to the present invention are characterized in that if illumination compensation is not performed for the current block, the inter-view motion candidate (IvMC) is included in the merge candidate list, and merge candidates are arranged in the merge candidate list in a priority order of the inter-view motion candidate (IvMC), the spatial neighboring block, and the temporal neighboring block.

A method and apparatus for encoding a multiview video signal according to the present invention are characterized in that a merge candidate list for a current block is generated, a motion vector of the current block is derived based on a merge index of the current block, a prediction value of the current block is acquired using the derived motion vector, and the current block is reconstructed by adding the acquired prediction value and a residual value of the current block.

The method and apparatus for encoding a multiview video signal according to the present invention are characterized in that the merge candidate list includes at least one merge candidate, and the at least one merge candidate includes at least one of a spatial neighboring block, a temporal neighboring block, or an inter-view motion candidate (IvMC).

The method and apparatus for encoding a multiview video signal according to the present invention are characterized in that the merge index specifies a merge candidate used to decode the current block in a merge mode.

The method and apparatus for encoding a multiview video signal according to the present invention are characterized in that the inter-view motion candidate (IvMC) has a temporal motion vector of a reference block specified by a disparity vector of the current block, and the reference block belongs to a reference view of the current block.

The method and apparatus for encoding a multiview video signal according to the present invention are characterized in that the inter-view motion candidate (IvMC) is restrictively included in the merge candidate list according to whether illumination compensation is performed for the current block.

The method and apparatus for encoding a multiview video signal according to the present invention are characterized in that if illumination compensation is not performed for the current block, the inter-view motion candidate (IvMC) is included in the merge candidate list, and merge candidates are arranged in the merge candidate list in a priority order of the inter-view motion candidate (IvMC), the spatial neighboring block, and the temporal neighboring block.

Advantageous Effects

According to the present invention, inter-view prediction can be performed efficiently using a disparity vector.

According to the present invention, a disparity vector of a current block can be derived effectively from depth data of a current depth block or a disparity vector of a neighboring texture block.

According to the present invention, merge candidates of a merge candidate list can be configured efficiently.

According to the present invention, encoding/decoding performance can be increased by selectively using an inter-view motion candidate in consideration of illumination compensation.

According to the present invention, encoding/decoding performance can be increased by prioritizing a plurality of merge candidates included in a merge candidate list.

DESCRIPTION OF DRAWINGS

FIG. 8 illustrates priority levels of merge candidates based on an illumination compensation flag, ic_flag according to an embodiment of the present invention.

BEST MODE

Figure 1:
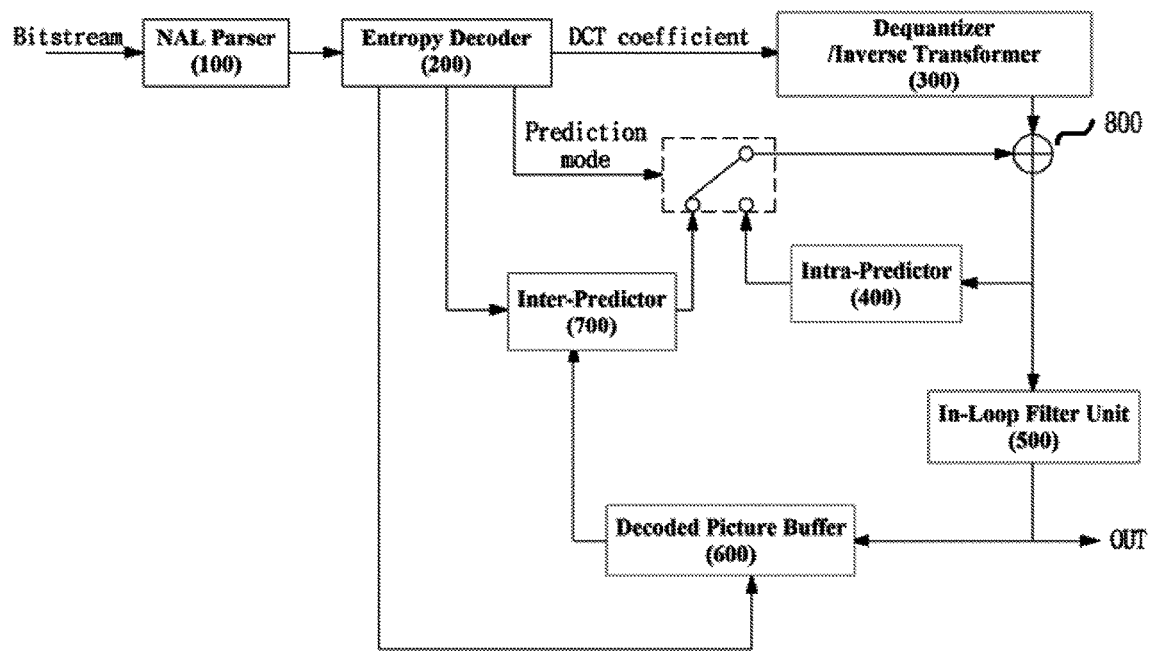
FIG. 1 is a schematic block diagram of a video decoder according to an embodiment of the present invention.

A method and apparatus for decoding a multiview video signal according to the present invention are characterized in that a merge candidate list for a current block is generated, a motion vector of the current block is derived based on a merge index of the current block, acquired from a bitstream, a prediction value of the current block is acquired using the derived motion vector, and the current block is reconstructed by adding the acquired prediction value and a residual value of the current block.

The method and apparatus for decoding a multiview video signal according to the present invention are characterized in that the merge candidate list includes at least one merge candidate, and the at least one merge candidate includes at least one of a spatial neighboring block, a temporal neighboring block, or an inter-view motion candidate (IvMC).

The method and apparatus for decoding a multiview video signal according to the present invention are characterized in that the merge index specifies a merge candidate used to decode the current block in a merge mode.

The method and apparatus for decoding a multiview video signal according to the present invention are characterized in that the inter-view motion candidate (IvMC) has a temporal motion vector of a reference block specified by a disparity vector of the current block, and the reference block belongs to a reference view of the current block.

The method and apparatus for decoding a multiview video signal according to the present invention are characterized in that the inter-view motion candidate (IvMC) is restrictively included in the merge candidate list according to whether illumination compensation is performed for the current block.

The method and apparatus for decoding a multiview video signal according to the present invention are characterized in that if illumination compensation is not performed for the current block, the inter-view motion candidate (IvMC) is included in the merge candidate list, and merge candidates are arranged in the merge candidate list in a priority order of the inter-view motion candidate (IvMC), the spatial neighboring block, and the temporal neighboring block.

A method and apparatus for encoding a multiview video signal according to the present invention are characterized in that a merge candidate list for a current block is generated, a motion vector of the current block is derived based on a merge index of the current block, a prediction value of the current block is acquired using the derived motion vector, and the current block is reconstructed by adding the acquired prediction value and a residual value of the current block.

The method and apparatus for encoding a multiview video signal according to the present invention are characterized in that the merge candidate list includes at least one merge candidate, and the at least one merge candidate includes at least one of a spatial neighboring block, a temporal neighboring block, or an inter-view motion candidate (IvMC).

The method and apparatus for encoding a multiview video signal according to the present invention are characterized in that the merge index specifies a merge candidate used to decode the current block in a merge mode.

The method and apparatus for encoding a multiview video signal according to the present invention are characterized in that the inter-view motion candidate (IvMC) has a temporal motion vector of a reference block specified by a disparity vector of the current block, and the reference block belongs to a reference view of the current block.

The method and apparatus for encoding a multiview video signal according to the present invention are characterized in that the inter-view motion candidate (IvMC) is restrictively included in the merge candidate list according to whether illumination compensation is performed for the current block.

The method and apparatus for encoding a multiview video signal according to the present invention are characterized in that if illumination compensation is not performed for the current block, the inter-view motion candidate (IvMC) is included in the merge candidate list, and merge candidates are arranged in the merge candidate list in a priority order of the inter-view motion candidate (IvMC), the spatial neighboring block, and the temporal neighboring block.

Mode for Carrying Out the Invention

Techniques for encoding or decoding a multiview video signal consider spatial redundancy, temporal redundancy, and inter-view redundancy. In the case of a multiview video, multiview texture images captured at two or more views may be encoded to realize a three-dimensional image. When needed, depth data corresponding to the multiview texture images may further be encoded. Needless to say, the depth data may be encoded in consideration of spatial redundancy, temporal redundancy, or inter-view redundancy. Depth data is a representation of information about a distance between a camera and a corresponding pixel. In the present disclosure, depth data may be flexibly interpreted as depth-related information such as a depth value, depth information, a depth image, a depth picture, a depth sequence, or a depth bitstream. Further, in the present disclosure, coding may cover the concepts of both encoding and decoding, and may be flexibly interpreted within the scope and spirit of the present invention.

FIG. 1 is a schematic block diagram of a video decoder according to an embodiment of the present invention.

Referring to FIG. 1, the video decoder may include a Network Abstraction Layer (NAL) parser 100, an entropy decoder 200, a dequantizer/inverse transformer 300, an intra-predictor 400, an in-loop filter unit 500, a decoded picture buffer unit 600, a reconstructor 800 and an inter-predictor 700.

The NAL parser 100 may receive a bitstream including multiview texture data. If depth data is required for encoding the texture data, a bitstream including encoded depth data may further be received. The input texture data and the input depth data may be transmitted in one bitstream or separate bitstreams. The NAL parser 100 may parse the received bitstream on a NAL basis to decode the bitstream. If the received bitstream is multiview-related data (e.g., a three-dimensional video), the bitstream may further include a camera parameter. Camera parameters may be classified into intrinsic camera parameters and extrinsic camera parameters. The intrinsic camera parameters may include a focal length, an aspect ratio, a principal point, and so on, whereas the extrinsic camera parameters may include information about the position of a camera in the global coordinate system.

The entropy decoder 200 may extract a quantized transform coefficient, coding information for prediction of a texture picture, and so on through entropy decoding.

The dequantizer/inverse transformer 300 may acquire a transform coefficient by applying a quantization parameter to the quantized transform coefficient, and decode the texture data or the depth data by inverse-transforming the transform coefficient. The decoded texture data or depth data may refer to residual data resulting from prediction. Further, a quantization parameter for a depth block may be set in consideration of the complexity of texture data. For example, if a texture block corresponding to a depth block is an area having high complexity, a low quantization parameter may be set, and if the texture block corresponding to the depth block is an area having low complexity, a high quantization parameter may be set. The complexity of a texture block may be determined based on a differential value between adjacent pixels in a reconstructed texture picture by Equation 1.

$$E = \frac{1}{N} \sum_{(x,y)} [|C_{x,y} - C_{x-1,y}| + |C_{x,y} - C_{x+1,y}|]^2 \qquad \text{Equation 1}$$

In Equation 1, E may represent the complexity of texture data, C may represent reconstructed texture data, and N may represent the number of pixels in a texture data area whose complexity is to be calculated. Referring to Equation 1, the complexity of texture data may be calculated using a differential value between texture data at position (x, y) and texture data at position (x−1, y), and a differential value between the texture data at position (x, y) and texture data at position (x+1, y). Also, complexity may be calculated for each of a texture picture and a texture block, and a quantization parameter may be derived using the calculated complexity by Equation 2.

$$\Delta QP = \min\left(\max\left(\alpha \log_2 \frac{E_f}{E_b}, -\beta\right), \beta\right) \qquad \text{Equation 2}$$

Referring to Equation 2, a quantization parameter for the depth block may be determined based on a ratio between the complexity of the texture picture and the complexity of the texture block. $\alpha$ and $\beta$ may be variable integers derived by the decoder or integers predetermined in the decoder.

The intra-predictor 400 may perform intra-picture prediction using reconstructed texture data of a current texture picture. Intra-picture prediction may be performed for a depth picture in the same manner as for the texture picture. For example, the same coding information used for intra-picture prediction of the texture picture may be used for the texture picture. The coding information used for intra-picture prediction may include information about an intra-prediction mode and intra-prediction partition information.

The in-loop filter unit 500 may apply an in-loop filter to each coded block in order to reduce block distortion. The filter may improve the video quality of a decoded picture by smoothing the edges of a block. Filtered texture pictures or depth pictures may be output, or stored in the decoded picture buffer unit 600, for use as reference pictures. Meanwhile, if texture data and depth data are encoded using the same in-loop filter, coding efficiency may be decreased because texture data differ from depth data in terms of characteristics. Accordingly, an in-loop filter may be defined separately for the depth data. As in-loop filtering methods for efficiently encoding depth data, a region-based adaptive loop filter and a trilateral loop filter will be described below.

In the case of the region-based adaptive loop filter, it may be determined whether to apply the region-based adaptive loop filter, based on the variance of a depth block. The variance of a depth block may be defined as a differential value between a maximum pixel value and a minimum pixel value in the depth block. It may be determined whether to apply the filter by comparing the variance of the depth block with a predetermined threshold. For example, if the variance of the depth block is equal to or larger than the predetermined threshold, this implies that the difference between the maximum and minimum pixel values of the depth block is wide. Therefore, it may be determined to apply the region-based adaptive loop filter. On the contrary, if the depth variance is smaller than the predetermined threshold, it may be determined not to apply the region-based adaptive loop filter. If the filter is used according to the comparison result, a pixel value of the filtered depth block may be derived by applying a predetermined weight to a neighboring pixel value. The predetermined weight may be determined based on a position difference between the current filtered pixel and its neighboring pixel and/or a differential value between the value of the current filtered pixel and the value of its neighboring pixel. The neighboring pixel value may be one of pixel values included in the depth block, except for the current filtered pixel value.

Although the trilateral loop filter of the present invention is similar to the region-based adaptive loop filter, the former is different from the latter in that texture data is additionally considered in the former. Specifically, the trilateral loop filter may extract depth data of neighboring pixels satisfying the following three conditions.

$$|p-q| \le \sigma 1 \qquad \text{Condition 1}$$

$$|D(p)-D(q)| \le \sigma 2 \qquad \text{Condition 2}$$

$$|V(p)-V(q)| \le \sigma 3 \qquad \text{Condition 3}$$

For Condition 1, a position difference between a current pixel p and a neighboring pixel q in a depth block is compared with a predetermined parameter σ1. For Condition 2, a differential value between depth data of the current pixel p and depth data of the neighboring pixel q is compared with a predetermined parameter σ2. For Condition 3, a differential value between texture data of the current pixel p and texture data of the neighboring pixel q is compared with a predetermined parameter σ3.

Neighboring pixels satisfying the above three conditions may be extracted, and the value of the current pixel p may be set to a mean value or an average value of the depth data of the neighboring pixels through filtering.

The decoded picture buffer unit 600 functions to store or open previously coded texture pictures or depth pictures, for inter-picture prediction. Each of the previously coded texture pictures or depth pictures may be stored or opened in the decoded picture buffer unit 600, using the frame number, frame_num, and Picture Order Count (POC) of the picture. Further, since there are depth pictures of different views from a current depth picture among the previously coded pictures, view identification information indicating the views of these depth pictures may be used to use the depth pictures as reference pictures, during depth coding. The decoded picture buffer unit 600 may manage reference pictures by an adaptive memory management control operation method, a sliding window method, and so on, for more flexible inter-picture prediction. This operation is performed in order to incorporate a memory for reference pictures and a memory for non-reference pictures into a single memory and efficiently manage the pictures with a small memory capacity. In depth coding, depth pictures may be marked with a separate indication to be distinguished from texture pictures in the decoded picture buffer unit, and information identifying each depth picture may be used during the marking.

The inter-predictor 700 may perform motion compensation on the current block using a reference picture stored in the decoded picture buffer unit 600, and motion information. In the present disclosure, it may be understood that motion information includes a motion vector, a reference index, and so on in its broad sense. The inter-predictor 700 may perform temporal inter-prediction to perform the motion compensation. Temporal inter-prediction may refer to inter-prediction based on reference pictures at the same view as and in a different time zone from a current texture block, and motion information of the current texture block. In the case of a multiview video captured by a plurality of cameras, inter-view prediction as well as temporal inter-prediction may be performed. Motion information used for the inter-view prediction may include a disparity vector or an inter-view motion vector. A method for performing inter-view prediction using a disparity vector will be described below with reference to FIG. 2.

Figure 2:
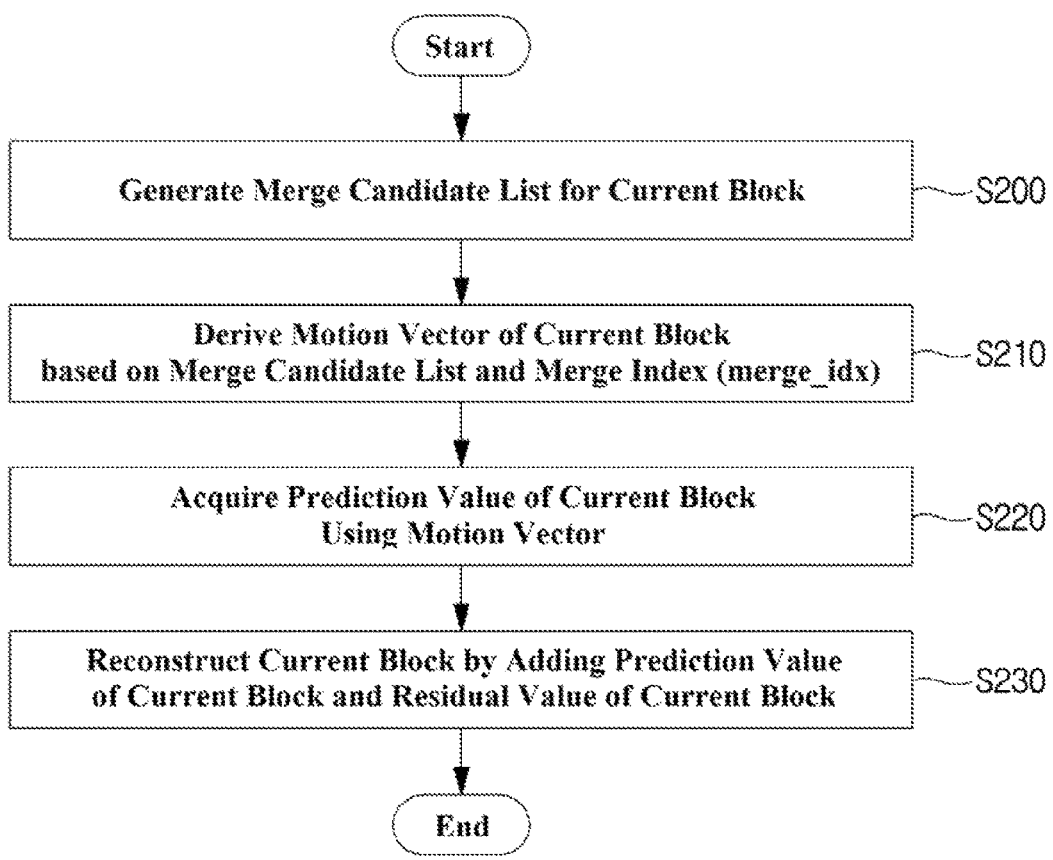
FIG. 2 is a flowchart illustrating a method for decoding a current block in a merge mode according to an embodiment of the present invention.

FIG. 2 is a flowchart illustrating a method for decoding a current block in a merge mode according to an embodiment of the present invention.

Referring to FIG. 2, a merge candidate list for a current block may be generated (S200).

The merge candidate list of the present invention may include at least one merge candidate available for decoding the current block in the merge mode. For example, a spatial/temporal neighboring block of the current block may be a merge candidate. The spatial neighboring block may be at least one of a left neighboring block, an upper neighboring block, an upper right neighboring block, a lower left neighboring block, and an upper left neighboring block. The temporal neighboring block may be defined as a block located at the same position as the current block, in a Col picture (collocated picture) having a different temporal order from the current block.

Also, a merge candidate based on an inter-view correlation or a texture-depth correlation (hereinafter, referred to as an inter-view merge candidate) may be included in the merge candidate list. Inter-view merge candidates may include a texture merge candidate, an inter-view motion candidate, an inter-view disparity candidate, a View Synthesis Prediction (VSP) candidate, and so on. A method for deriving a motion vector of each inter-view merge candidate and a method for configuring merge candidates in a merge candidate list will be described later with reference to FIGS. 3 to 6.

Referring to FIG. 2, a motion vector of the current block may be derived based on the merge candidate list generated in step S200, and a merge index, merge_idx (S210).

Specifically, a merge candidate corresponding to the merge index of the current block may be selected from the merge candidate list. The merge index is a syntax specifying one of a plurality of merge candidates included in the merge candidate list, which may be extracted from a bitstream.

That is, the merge index is information specifying the merge candidate used to derive the motion vector of the current block.

A motion vector allocated to the selected merge candidate may be set as the motion vector of the current block.

A prediction value of the current block may be acquired using the motion vector derived in step S210 (S200).

Specifically, if a reference picture of the current block and the current block belong to the same view, temporal inter-prediction may be performed for the current block, using the motion vector. On the contrary, if the reference picture of the current block and the current block belong to different views, inter-view inter prediction may be performed for the current block, using the motion vector.

It may be determined whether the reference picture of the current block and the current block belong to the same view by specifying the reference picture in a reference picture list, using a reference index of the current block and comparing a view index of the specified reference picture with a view index of the current block.

Referring to FIG. 2, the current block may be reconstructed by adding the prediction value of the current block acquired in step S220 and a residual value of the current block (S230).

The residual value refers to a differential value between a reconstruction value of the current block and the prediction value of the current block. The residual value may be acquired by dequantizing and/or inverse-transforming a transform coefficient extracted from a bitstream.

Now, a description will be given of the method for deriving a motion vector of an inter-view merge candidate and the method for configuring merge candidates in a merge candidate list, which have been mentioned before with reference to FIG. 2.

I. Method for Deriving Motion Vector of Inter-view Merge Candidate

1. Texture Merge Candidate (T)

Since texture data and depth data of a video describe an image of the same time and the same view, the texture data and the depth data are highly correlated. Therefore, if the depth data is encoded/decoded using the same motion vector used for encoding/decoding the texture data, the encoding/decoding performance of the video may be increased.

Specifically, if a current block is a depth block (Depth-Flag=1), a motion vector of a texture block corresponding to the depth block may be allocated to the texture merge candidate. The texture block may be determined to be a block at the same position as the depth block.

2. Inter-view Motion Candidate (IvMC)

A motion vector of the inter-view motion candidate may be derived by inter-view motion prediction, which will be described with reference to FIG. 3.

Figure 3:
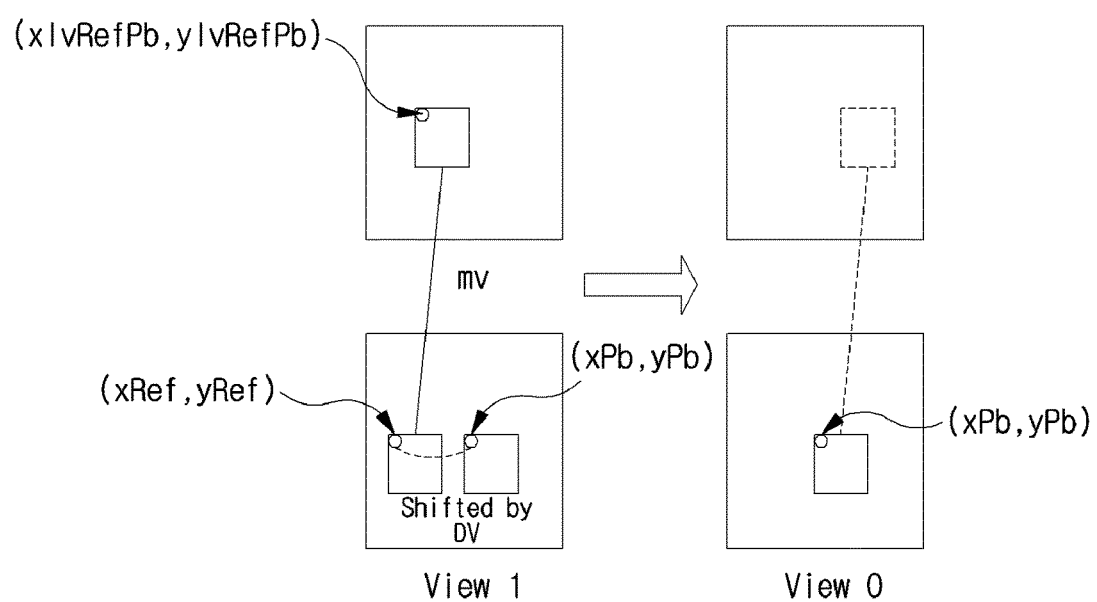
FIG. 3 illustrates a method for deriving a motion vector of an inter-view motion candidate by inter-view motion prediction according to an embodiment of the present invention.

Referring to FIG. 3, a reference block of a reference view (view 1) may be specified for a current block of a current view (view 0), using a disparity vector. For example, a block at a position shifted from a block position of the reference view corresponding to a position of the current block by the disparity vector may be specified as the reference block. If the reference block has a temporal motion vector (i.e., if the reference block is encoded by temporal inter-prediction), the temporal motion vector of the reference block may be allocated to the inter-view motion candidate.

Also, inter-view motion prediction may be performed for the current block on a sub-block basis. In this case, the current block may be divided into sub-blocks (e.g., 8×8 sub-blocks), and a temporal motion vector of the reference block may be acquired on a sub-block basis and allocated to the inter-view motion candidate.

Meanwhile, the disparity vector of the current block may be derived from a depth image corresponding to the current block, which will be described in detail with reference to FIG. 5. The disparity vector may also be derived from a block spatially neighboring to the current block, or from a temporal neighboring block located in a different time zone from the current block. A method for deriving a disparity vector of a current block from a spatial/temporal neighboring block of the current block will be described with reference to FIG. 6.

3. Inter-view Motion Shift Candidate (IvMCShift)

A disparity vector of the afore-described inter-view motion shift candidate may be shifted by a predetermined value, and a reference block of a reference view (view 0) may be specified using the shifted disparity vector. Specifically, the shifted disparity vector may be derived by shifting the disparity vector of the inter-view motion shift candidate (IvMC), taking into account the width (nPbW)/height (nPbH) of the current block. For example, the shifted disparity vector may be derived by shifting the disparity vector of the inter-view motion candidate (IvMC) by (nPbW*2, nPbH*2).

If the reference block has a temporal motion vector, the temporal motion vector of the reference block may be allocated to the inter-view motion shift candidate.

4. Inter-view disparity Candidate (IvDC)

As described above, the disparity vector of the current block may be derived from the depth image corresponding to the current block or the spatial/temporal neighboring block of the current block. A vector obtained by setting the vertical component (y component) of the derived disparity vector to 0 may be allocated to the inter-view disparity candidate. For example, if the derived disparity vector of the current block is (mvDisp[0], mvDisp[1]), a vector (mvDisp[0], 0) may be allocated to the inter-view disparity candidate.

5. Inter-view Disparity Shift Candidate (IvDCShift)

Likewise, the disparity vector of the current block may be derived from the depth image corresponding to the current block or the spatial/temporal neighboring block of the current block. A vector obtained by shifting the horizontal component (x component) of the derived disparity vector by a predetermined value may be allocated to the inter-view disparity shift candidate. For example, if a motion vector of the inter-view disparity candidate is (mvDisp[0], mvDisp[1]), a vector obtained by shifting the horizontal component mvDisp[0] by 4, that is, (mvDisp[0]+4, mvDisp[1]) may be allocated to the inter-view disparity shift candidate.

Or a vector obtained by shifting the horizontal component (x component) of the derived disparity vector by a predetermined value, and setting the vertical component (y component) of the derived disparity vector to 0 may be allocated to the inter-view disparity shift candidate. For example, if the motion vector of the inter-view disparity candidate is (mvDisp[0], mvDisp[1]), a vector obtained by shifting the horizontal component mvDisp[0] by 4 and setting the vertical component mvDisp[1] to 0, that is, a vector (mvDisp[0]+4, mvDisp[0]) may be allocated to the inter-view disparity shift candidate.

6. VSP Candidate

A motion vector of the VSP candidate may also be derived based on the afore-described disparity vector of the current block, which will be described with reference to FIG. 4.

Figure 4:
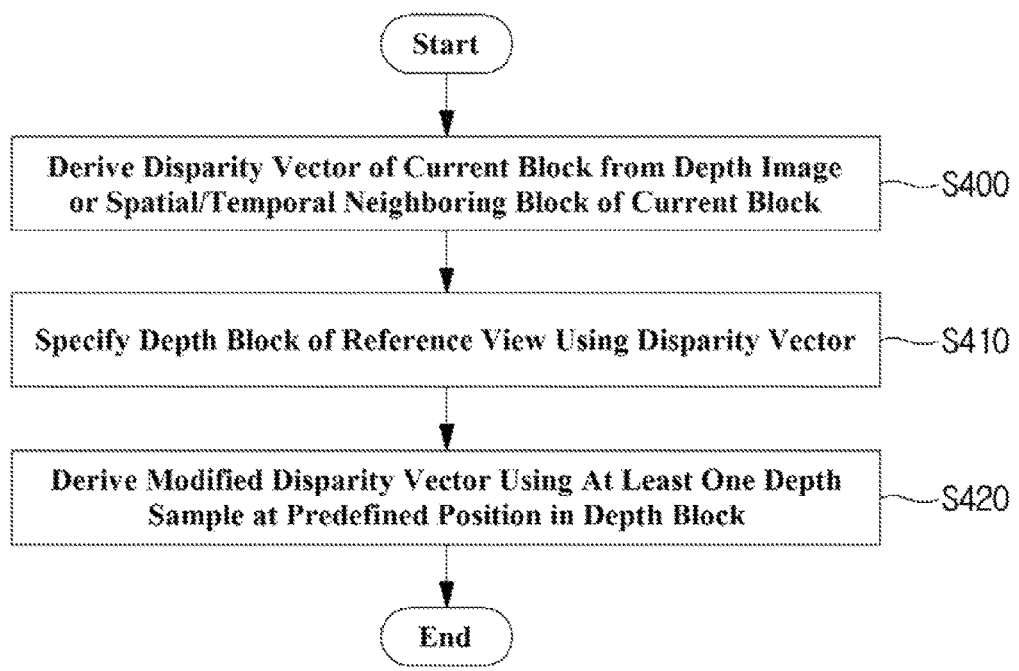
FIG. 4 is a flowchart illustrating a method for deriving a motion vector of a View Synthesis Prediction (VSP) candidate based on a disparity vector of a current block according to an embodiment of the present invention.

Referring to FIG. 4, a disparity vector (a first disparity vector) may be derived from a depth image or spatial/temporal neighboring block of a current block (S400). A method for deriving a disparity vector will be described later with reference to FIGS. 5 and 6.

A depth block of a reference view may be specified using the disparity vector derived in step S400 (S410). Herein, the depth block may be included in a reference depth picture. The reference depth picture and a reference texture picture may belong to the same access unit, and the reference texture picture may correspond to an inter-view reference picture of the current block.

A modified disparity vector (a second disparity vector) may be derived using at least one sample at a predefined position in the depth block specified in step S410 (S420). For example, depth samples at four corners of the depth block may be used. The second disparity vector may be derived from the maximum of the values of the depth samples at the four corners, the average value of the values of the depth samples at the four corners, or one of the depth samples at the four corners.

Figure 5:
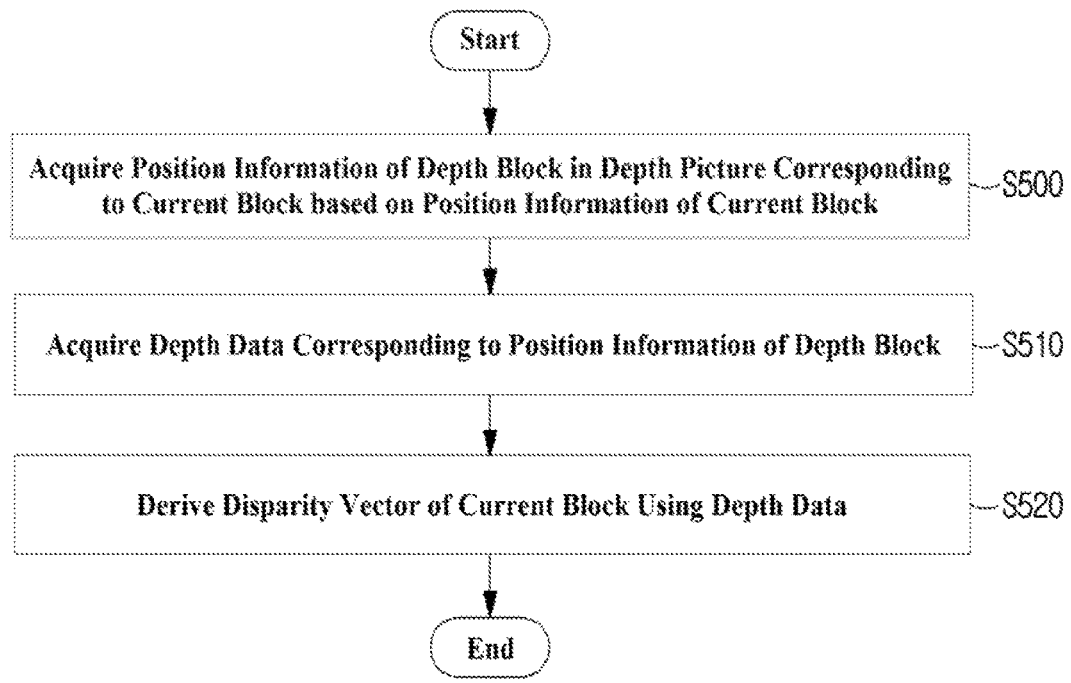
FIG. 5 is a flowchart illustrating a method for deriving a disparity vector of a current block using depth data of a depth image according to an embodiment of the present invention.

FIG. 5 is a flowchart illustrating a method for deriving a disparity vector of a current block using depth data of a depth picture according to an embodiment of the present invention.

Referring to FIG. 5, information about a position of a depth block in a depth picture, corresponding to a current block may be acquired based on information about a position of the current block (S500).

The position of the depth block may be determined in consideration of spatial resolutions of the depth picture and a current picture.

For example, if the depth picture and the current picture have been encoded with the same spatial resolution, the position of the depth block may be determined to be the same as that of the current block in the current picture. Meanwhile, the current picture and the depth picture may be encoded with different spatial resolutions. This is because in view of the nature of depth information representing information about a distance between a camera and an object, even though the depth information is encoded with a decreased spatial resolution, coding efficiency may not be decreased greatly. Therefore, if the depth picture has been encoded with a lower spatial resolution than the current picture, the decoder may upsample the depth picture before acquiring the information about the position of the depth block. Also, if an aspect ratio of the upsampled depth picture does not accurately match an aspect ratio of the current picture, offset information may be additionally considered in acquiring the information about the position of the current depth block in the upsampled depth picture. The offset information may include at least one of upper offset information, left offset information, right offset information, and lower offset information. The upper offset information may indicate a position difference between at least one pixel at an upper end of the upsampled depth picture and at least one pixel at an upper end of the current picture. The left, right, and lower offset information may also be defined in the same manner.

Referring to FIG. 5, depth data corresponding to the information about the position of the depth block may be acquired (S510).

If there are a plurality of pixels in the depth block, depth data corresponding to a corner pixel of the depth block may be used. Or depth data corresponding to a center pixel of the depth block may be used. Or one of maximum, minimum, and most frequent values of a plurality of depth data corresponding to the plurality of pixels may be selectively used, or a average value of the plurality of depth data may be used.

Referring to FIG. 5, a disparity vector of the current block may be derived using the depth data acquired in step S510 (S520).

For example, the disparity vector of the current block may be derived by Equation 3.

$$DV=(\alpha*v+f)\!\gg\! n \qquad \text{Equation 3}$$

Referring to Equation 3, v represents depth data, a represents a scaling factor, and f represents an offset used to derive a disparity vector. The scaling factor a and the offset f may be signaled in a video parameter set or a slice header, or preconfigured in the decoder. Herein, n is a variable indicating a bit shift value, which may be determined variably according to the accuracy of the disparity vector.

Figure 6:
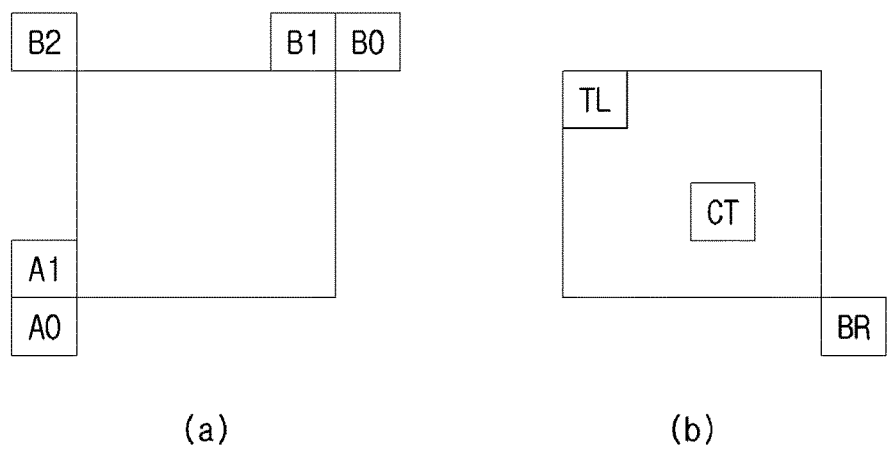
FIG. 6 illustrates candidates for a spatial/temporal neighboring block of a current block according to an embodiment of the present invention.

FIG. 6 illustrates candidates for a spatial/temporal neighboring block of a current block according to an embodiment of the present invention.

Referring to FIG. 6(a), the spatial neighboring block may be at least one of a left neighboring block A1, an upper neighboring block B1, a lower left neighboring block A0, an upper right neighboring block B0, or a upper left neighboring block B2 of the current block.

Referring to FIG. 6(b), the temporal neighboring block may refer to a block at the same position as the current block. Specifically, the temporal neighboring block is a block belonging to a picture in a different time zone from the current block. The temporal neighboring block may be at least one of a block BR corresponding to a lower right pixel of the current block, a block CT corresponding to a center pixel of the current block, or a block TL corresponding to an upper left pixel of the current block.

The disparity vector of the current block may be derived from a Disparity-Compensated Prediction (DCP) block among the above spatial/temporal neighboring blocks. The DCP block may refer to a block encoded by inter-view texture prediction using a disparity vector. In other words, inter-view prediction may be performed for the DCP block, using texture data of a reference block specified by the disparity vector. In this case, the disparity vector of the current block may be predicted or reconstructed using the disparity vector used for the inter-view texture prediction of the DCP block.

Or the disparity vector of the current block may be derived from a Disparity Vector-based Motion Compensation Prediction (DV-MCP) block among the spatial neighboring blocks. The DV-MCP block may refer to a block encoded by inter-view motion prediction using a disparity vector. In other words, temporal inter-prediction may be performed for the DV-MCP block, using a temporal motion vector of a reference block specified by the disparity vector. In this case, the disparity vector of the current block may be predicted or reconstructed using the disparity vector used to acquire the temporal motion vector of the reference block of the DV-MCP block.

For the current block, it may be determined whether the spatial/temporal neighboring blocks are DCP block according to their predetermined priority levels, and the disparity vector of the current block may be derived from the first detected DCP block. For example, the neighboring blocks may be prioritized preliminarily in the order of spatial neighboring blocks->temporal neighboring blocks, and it may be determined whether the spatial neighboring blocks are DCP blocks in the priority order of A1->B1->B0->A0->B2. However, the prioritization is a mere embodiment, and it is obvious that the neighboring blocks may be prioritized in different ways within a scope apparent to those skilled in the art.

If none of the spatial/temporal neighboring blocks are DCP blocks, it may be additionally checked whether the spatial neighboring blocks are DV-MCP blocks. Likewise, the disparity vector may be derived from the first detected DV-MCP block.

II. Method for Configuring Merge Candidate List

A maximum number of merge candidates, MaxNumMergeCand in a merge candidate list may be determined variably. However, the maximum number of merge candidates, MaxNumMergeCand may be determined restrictively within a predetermined range (e.g., 1 to 6). Encoding performance may be increased by adaptively controlling the maximum number of merge candidates, MaxNumMergeCand on a slice basis.

For example, the maximum number of merge candidates, MaxNumMergeCand may be derived by Equation 4.

$$\text{MaxNumMergeCand} = 5 - \text{five\_minus\_max\_num\_merge\_cand} + \text{NumExtraMergeCand} \quad \text{(Equation 4)}$$

In Equation 4, five_minus_max_num_merge_cand is a syntax at the slice segment level, which may indicate the difference between the maximum number (e.g., 5) of merge candidates except for the number of inter-view merge candidates and the maximum number of merge candidates per slice except for the number of inter-view merge candidates. The variable NumExtraMergeCand may be derived by Equation 5.

$$\text{NumExtraMergeCand} = \text{iv\_mv\_pred\_flag[nuh\_layer\_id]}, \|\text{mpi\_flag[nuh\_layer\_id]}\|, \text{ViewSynthesisPredFlag} \quad \text{(Equation 5)}$$

In Equation 5, the variable NumExtraMergeCand may be derived based on iv_mv_pred_flag[nuh_layer_id], mpi_flag[nuh_layer_id], or ViewSynthesisPredFlag.

Herein, iv_mv_pred_flag is a syntax indicating whether inter-view motion prediction is performed at a current view. For example, if iv_mv_pred_flag=1, inter-view motion prediction is performed, and otherwise, inter-view motion prediction is not performed. Accordingly, if iv_mv_pred_flag=1, an inter-view motion candidate (IvMC) based on inter-view motion prediction may be used, and the variable NumExtraMergeCand may be set to 1.

mpi_flag is a syntax indicating whether motion parameter inheritance is performed. For example, use of a motion vector of a texture block corresponding to a depth block or derivation of the motion vector of the texture block from a reference block of a neighboring view during decoding of the depth block is called motion parameter inheritance. Therefore, if motion parameter inheritance is performed according to mpi_flag, the afore-described texture merge candidate or inter-view motion candidate (IvMC) may be used as a merge candidate of the current block, and the variable NumExtraMergeCand may be set to 1.

ViewSynthesisPredFlag is a flag indicating whether a VSP candidate is used. Therefore, if ViewSynthesisPredFlag is set to 1, a VSP candidate may be added to the merge candidate list for the current block, and the variable NumExtraMergeCand may be set to 1.

The afore-described merge candidates, that is, the spatial/temporal neighboring blocks and the inter-view merge candidate of the current block may be included in the merge candidate list for the current block. Notably, as many merge candidates as the maximum number of merge candidates, MaxNumMergeCand may be included in the merge candidate list.

For this purpose, the priority levels (or arrangement order) of the merge candidates added to the merge candidate list need to be defined.

For example, the merge candidates may be prioritized in the order of the inter-view motion candidate (IvMC), the left neighboring block A1, the upper neighboring block B1, the upper right neighboring block B0, the inter-view disparity candidate (IvDC), the VSP candidate, the lower left neighboring block A0, the upper left neighboring block B2, the inter-view motion shift candidate (IvMCShift), and the inter-view disparity shift candidate (IvDCShift).

Or the merge candidates may be prioritized in the order of the inter-view motion candidate (IvMC), the left neighboring block A1, the upper neighboring block B1, the VSP candidate, the upper right neighboring block B0, the inter-view disparity candidate (IvDC), the lower left neighboring block A0, the upper left neighboring block B2, the inter-view motion shift candidate (IvMCShift), and the inter-view disparity shift candidate (IvDCShift). Obviously, these priority levels may be changed within a scope apparent to those skilled in the art.

Figure 7:
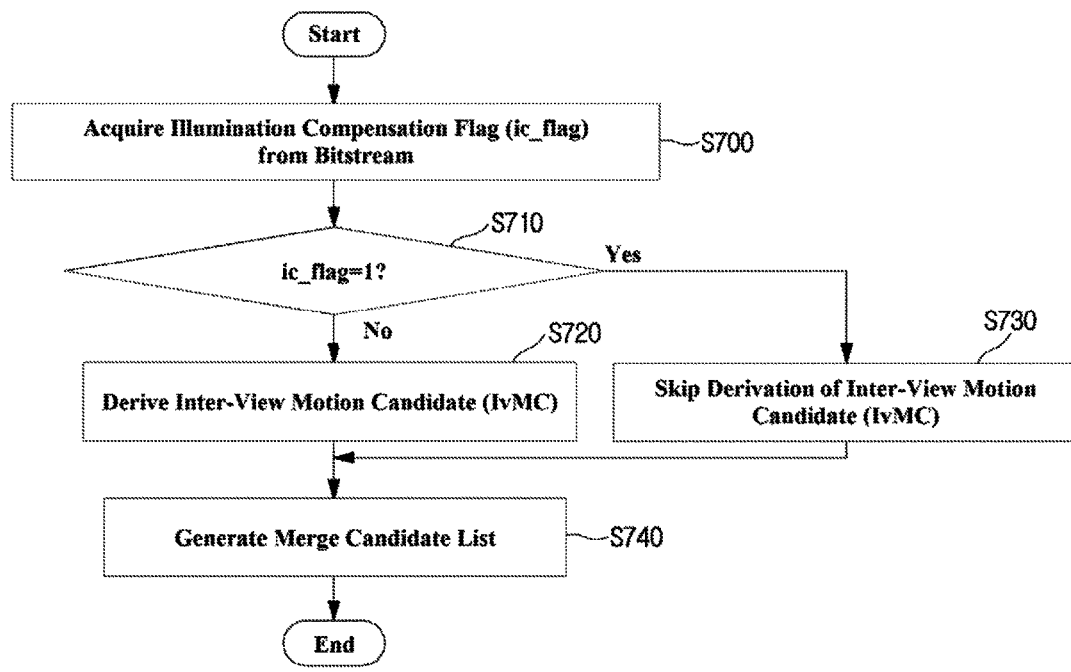
FIG. 7 is a flowchart illustrating a method for using an Inter-view Motion Candidate (IvMC) adaptively based on an illumination compensation flag, ic_flag according to an embodiment of the present invention.

FIG. 7 is a flowchart illustrating a method for adaptively using an inter-view motion candidate (IvMC) based on an illumination compensation flag, ic_flag according to an embodiment of the present invention.

Referring to FIG. 7, an illumination compensation flag may be acquired from a bitstream (S700).

The illumination compensation flag may refer to information indicating whether illumination compensation is performed for a current block (e.g., a coding block or a prediction unit). According to the present invention, illumination compensation means compensation for an illumination difference between views. If there is an illumination difference between views, it may be more efficient to use an inter-view disparity candidate (IvDC) than an inter-view motion candidate (IvMC). Therefore, it may be regulated that an inter-view motion candidate (IvMC) is selectively used based on the illumination compensation flag.

Referring to FIG. 7, it may be determined whether the value of the illumination compensation flag acquired in step S700 is 1 (S710).

If the value of the illumination compensation flag is not 1 (i.e., is flag=0), an inter-view motion candidate (IvMC) may be derived (S720).

A merge candidate list including the inter-view motion candidate (IvMC) acquired in step S720 may be generated (S740). That is, the inter-view motion candidate (IvMC) may be added to the merge candidate list according to the afore-described prioritization.

On the contrary, if the value of the illumination compensation flag is 1, the derivation of an inter-view motion candidate (IvMC) may be skipped (S730).

In this case, an inter-view motion shift candidate (IvMCShift) related to the inter-view motion candidate (IvMC) may also be excluded from the merge candidate list. Merge candidates except for the inter-view motion candidate (IvMC) and the inter-view motion shift candidate (IvMCShift) may be added to the merge candidate list according to the afore-described prioritization. For example, merge candidates within the maximum number of merge candidates, MaxNumMergeCand may be added to the merge candidate list in the priority order of the left neighboring block A1, the upper neighboring block B1, the inter-view disparity candidate (IvDC), the upper right neighboring block B0, the VSP candidate, the lower left neighboring block A0, the upper left neighboring block B2, and the inter-view disparity shift candidate (IvDCShift).

Or merge candidates may be added to the merge candidate list in the priority order of the left neighboring block A1, the upper neighboring block B1, the inter-view disparity candidate (IvDC), the upper right neighboring block B0, the VSP candidate, the inter-view disparity shift candidate (IvDCShift), the lower left neighboring block A0, and the upper left neighboring block B2.

Or merge candidates may be added to the merge candidate list in the priority order of the left neighboring block A1, the upper neighboring block B1, the upper right neighboring block B0, the inter-view disparity candidate (IvDC), the VSP candidate, the lower left neighboring block A0, the upper left neighboring block B2, and the inter-view disparity shift candidate (IvDCShift).

FIG. 8 illustrates the priority levels of merge candidates based on an illumination compensation flag, ic_flag according to an embodiment of the present invention.

As described before with reference to FIG. 7, when there is an illumination difference between views, it may be more efficient to use an inter-view disparity candidate (IvDC) than an inter-view motion candidate (IvMC). Therefore, coding performance may be increased by changing the priority levels of merge candidates so that the inter-view disparity candidate (IvDC) may have priority over the inter-view motion candidate (IvMC). Also, the priority levels of merge candidates may be changed so that the inter-view disparity shift candidate (IvDCShift) may have priority over the inter-view motion shift candidate (IvMC Shift).

Referring to FIG. 8, if the value of the illumination compensation flag is 1, merge candidates may be added to a merge candidate list in the priority order of the inter-view disparity candidate (IvDC), the left neighboring block A1, the upper neighboring block B1, the inter-view motion candidate (IvMC), the upper right neighboring block B0, the VSP candidate, the inter-view disparity shift candidate (IvDCShift), the inter-view motion shift candidate (IvMCShift), the lower left neighboring block A0, and the upper left neighboring block B2. In FIG. 8, as a merge candidate has a lower priority value, the merge candidate has a higher priority level, and as a merge candidate has a higher priority value, the merge candidate has a lower priority level.

On the other hand, if the value of the illumination compensation flag is 0, merge candidates may be added to the merge candidate list in the priority order of the inter-view motion candidate (IvMC), the left neighboring block A1, the upper neighboring block B1, the inter-view disparity candidate (IvDC), the upper right neighboring block B0, the VSP candidate, the inter-view motion shift candidate (IvMCShift), the inter-view disparity shift candidate (IvDCShift), the lower left neighboring block A0, and the upper left neighboring block B2.

INDUSTRIAL APPLICABILITY

The present invention is applicable to multiview video coding.

The invention claimed is:

1. A method for decoding a multiview video signal, by an apparatus including at least one memory and at least one processor including an inter-predictor, configured to perform operations for decoding a multiview video signal, the method comprising;
   generating, by the at least one processor, a merge candidate list for a current block, the merge candidate list including at least one merge candidate, and the merge candidate including at least one of a spatial neighboring block, a temporal neighboring block, or an inter-view motion candidate;
   deriving, by the at least one processor, a motion vector of the current block based on a merge index of the current block acquired from a bitstream, the merge index specifying a merge candidate to be used to decode the current block in a merge mode;
   acquiring, by the at least one processor, a prediction value of the current block using the derived motion vector; and
   reconstructing the current block by adding the acquired prediction value and a residual value of the current block,
   wherein the inter-view motion candidate (IvMC) has a temporal motion vector of a reference block specified by a disparity vector of the current block, and the reference block belongs to a reference view of the current block, and
   wherein the inter-view motion candidate (IvMC) is restrictively included in the merge candidate list according to whether illumination compensation is performed for the current block.

2. The method according to claim 1, wherein when the illumination compensation is not performed for the current block, the inter-view motion candidate (IvMC) is included in the merge candidate list, and
   wherein merge candidates are arranged in the merge candidate list in a priority order of the inter-view motion candidate (IvMC), the spatial neighboring block, and the temporal neighboring block.

3. An apparatus for decoding a multiview video signal, the apparatus comprising;
   an inter-predictor configured to generate a merge candidate list for a current block, derive a motion vector of the current block based on a merge index of the current block acquired from a bitstream, and acquire a prediction value of the current block using the derived motion vector; and
   a reconstructor configured to reconstruct the current block by adding the acquired prediction values and a residual value of the current block,
   wherein the merge candidate list includes at least one merge candidate, the merge candidate includes at least one of a spatial neighboring block, a temporal neighboring block, or an inter-view motion candidate (IvMC), and the merge index specifies a merge candidate to be used to decode the current block in a merge mode,
   wherein the inter-view motion candidate (IvMC) has a temporal motion vector of a reference block specified by a disparity vector of the current block, and the reference block belongs to a reference view of the current block, and
   wherein the inter-view motion candidate (IvMC) is restrictively included in the merge candidate list according to whether illumination compensation is performed for the current block.

4. The apparatus according to claim 3, wherein when the illumination compensation is not performed for the current block, the inter-view motion candidate (IvMC) is included in the merge candidate list, and
   wherein merge candidates are arranged in the merge candidate list in a priority order of the inter-view motion candidate (IvMC), the spatial neighboring block, and the temporal neighboring block.

5. A method for encoding a multiview video signal, by an apparatus including at least one memory and at least one processor including an inter-predictor, configured to perform operations for decoding a multiview video signal, the method comprising;

generating, by the at least one processor, a merge candidate list for a current block, the merge candidate list including at least one merge candidate, and the merge candidate including at least one of a spatial neighboring block, a temporal neighboring block, or an inter-view motion candidate (IvMC);

deriving, by the at least one processor, a motion vector of the current block based on a merge index of the current block, the merge index specifying a merge candidate to be used to encode the current block in a merge mode;

acquiring, by the at least one processor, a prediction value of the current block using the derived motion vector; and reconstructing, by the at least one processor, the current block by adding the acquired prediction value and a residual value of the current block, wherein the inter-view motion candidate (IvMC) has a temporal motion vector of a reference block specified by a disparity vector of the current block, and the reference block belongs to a reference view of the current block, and wherein the inter-view motion candidate (IvMC) is restrictively included in the merge candidate list according to whether illumination compensation is performed for the current block.

6. The method according to claim 5, wherein when the illumination compensation is not performed for the current block, the inter-view motion candidate (IvMC) is included in the merge candidate list, and merge candidates are arranged in the merge candidate list in a priority order of the inter-view motion candidate (IvMC), the spatial neighboring block, and the temporal neighboring block.

7. An apparatus for encoding a multiview video signal, the apparatus comprising;
an inter-predictor configured to generate a merge candidate list for a current block, derive a motion vector of the current block based on a merge index of the current block, and acquire a prediction value of the current block using the derived motion vector; and a reconstructor configured to reconstruct the current block by adding the acquired prediction value and a residual value of the current block, wherein the merge candidate list includes at least one merge candidate, the merge candidate includes at least one of a spatial neighboring block, a temporal neighboring block, or an inter-view motion candidate (IvMC), and the merge index specifies a merge candidate to be used to encode the current block in a merge mode, wherein the inter-view motion candidate (IvMC) has a temporal motion vector of a reference block specified by a disparity vector of the current block, and the reference block belongs to a reference view of the current block, and wherein the inter-view motion candidate (IvMC) is restrictively included in the merge candidate list according to whether illumination compensation is performed for the current block.

* * * * *